(12) United States Patent
Yanai

(10) Patent No.: US 7,949,208 B2
(45) Date of Patent: May 24, 2011

(54) MONITOR SYSTEM, MONITOR DEVICE, SEARCH METHOD, AND SEARCH PROGRAM

(75) Inventor: Shin Yanai, Tokyo (JP)

(73) Assignee: Sony Corporation (JP)

( * ) Notice: Subject to any disclaimer, the term of this patent is extended or adjusted under 35 U.S.C. 154(b) by 999 days.

(21) Appl. No.: 11/824,105

(22) Filed: Jun. 28, 2007

(65) Prior Publication Data

US 2008/0005088 A1 Jan. 3, 2008

(30) Foreign Application Priority Data

Jun. 30, 2006 (JP) ................ P2006-182825

(51) Int. Cl.
G06K 9/54 (2006.01)
G06K 9/00 (2006.01)
H04N 7/18 (2006.01)
(52) U.S. Cl. ......... 382/305; 382/103; 348/135; 348/143
(58) Field of Classification Search .................. 382/100, 382/103, 305–306; 348/135–159
See application file for complete search history.

(56) References Cited

U.S. PATENT DOCUMENTS

| 6,411,724 | B1* | 6/2002 | Vaithilingam et al. | 382/100 |
| 6,643,387 | B1* | 11/2003 | Sethuraman et al. | 382/107 |
| 6,665,442 | B2* | 12/2003 | Sekiguchi et al. | 382/224 |
| 7,454,037 | B2* | 11/2008 | Higgins | 382/103 |
| 7,606,741 | B2* | 10/2009 | King et al. | 705/27 |

FOREIGN PATENT DOCUMENTS

| JP | 2001-167095 A | 6/2001 |
| JP | 2002-165210 A | 6/2002 |
| JP | 2002-189757 A | 7/2002 |
| JP | 2003-134435 A | 5/2003 |
| JP | 2004-247844 A | 9/2004 |
| JP | 2006-139382 A | 6/2006 |

* cited by examiner

*Primary Examiner* — Manav Seth
(74) *Attorney, Agent, or Firm* — Lerner, David, Littenberg, Krumholz & Mentlik, LLP

(57) ABSTRACT

A search method is provided so that video data transmitted from an image-pickup unit of a monitor terminal is accumulated, meta data transmitted from a meta-data-generation unit of the monitor terminal is accumulated, search criteria are stored in advance, where the search criteria are used for extracting desired data from the video data and/or the meta data, the search criteria stored in advance are displayed, and meta data and/or video data satisfying a predetermined search criterion is extracted when the predetermined search criterion is selected from among the displayed search criteria, and the extracted meta data and/or the extracted video data is displayed.

6 Claims, 7 Drawing Sheets

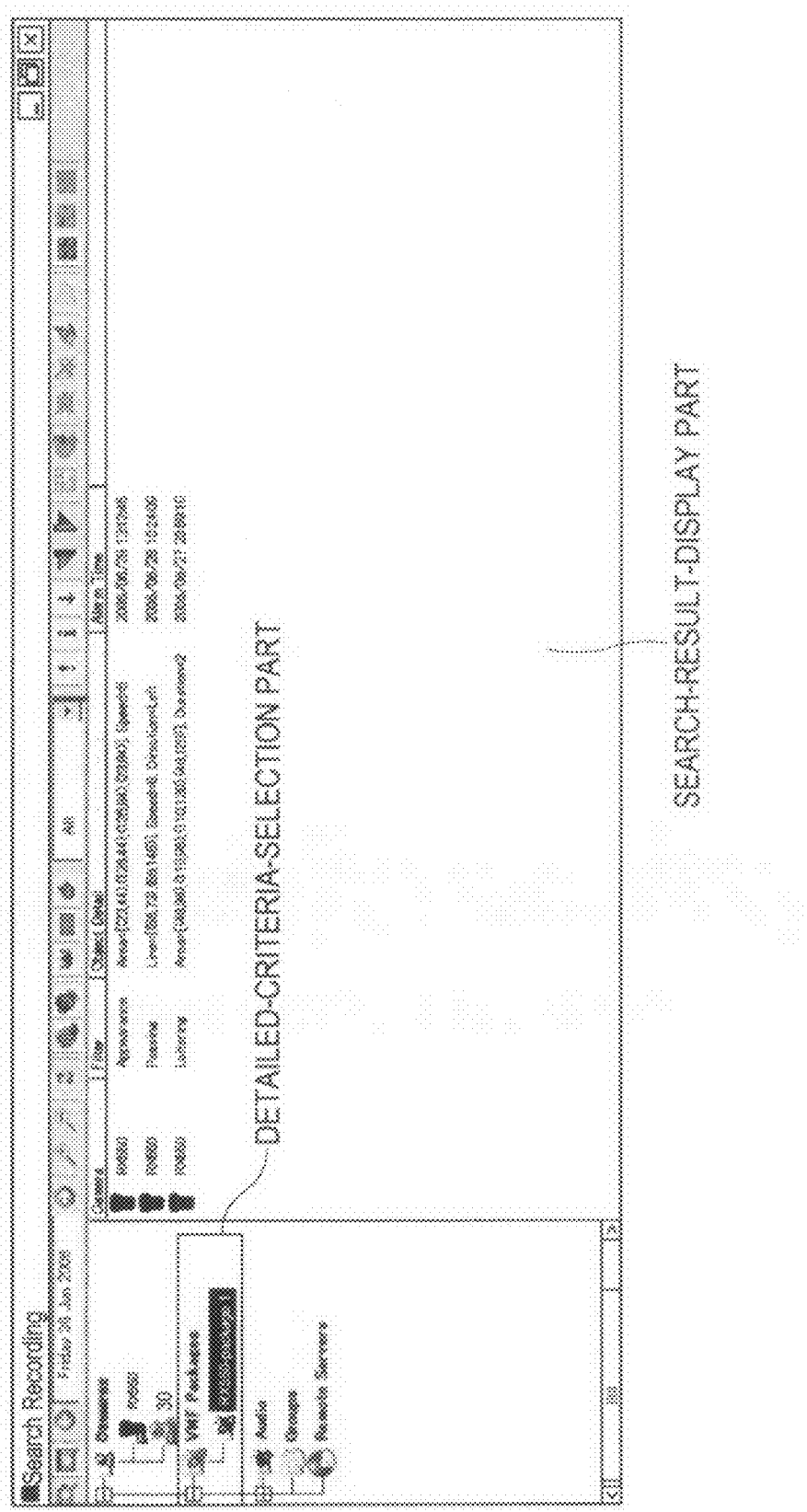

MONITOR SYSTEM, MONITOR DEVICE, SEARCH METHOD, AND SEARCH PROGRAM

CROSS REFERENCES TO RELATED APPLICATIONS

The present invention contains subject matter related to Japanese Patent Application JP 2006-182825 filed in the Japanese Patent Office on Jun. 30, 2006, the entire contents of which are incorporated herein by reference.

BACKGROUND OF THE INVENTION

1. Field of the Invention

The present invention relates to a monitor system including at least one monitor terminal and at least one monitor device, the monitor device, a search method, and a search program.

2. Description of the Related Art

Hitherto, known monitor systems including at least one monitor terminal and at least one monitor device have been used, so as to view a monitor subject of which image is picked up by the monitor terminal in real time. Further, the monitor systems have been used, so as to store data on the monitor subject, and search for predetermined data across the stored data and confirm the predetermined data at a later time.

Usually, information about the date and time where data is stored and/or information about a name given to the stored data is usually adopted, as a search criterion by which a search for the stored data is made. An example of the above-described known monitor systems is disclosed in Japanese Unexamined Patent Application Publication No. 2003-274390.

SUMMARY OF THE INVENTION

Incidentally, when a search for stored data is made on the basis of information about the date and time where the data storage is performed and/or information about the stored-data name, a large number of data items may be extracted. Further, the search criterion should be set minutely, so as to reduce the number of data items for extraction. Subsequently, the configuration of an interface used for making the above-described search becomes complicated.

Further, since the storage of the monitor-subject data is desired in various scenes, a search for the stored data has to be made by criteria that were never expected when the monitor-subject data was stored with increased frequency. In that case, a user has to input another criterion manually. However, the user has to take the trouble to input the criterion almost every time the user wishes to make a search, which places a significant load on the user.

According to an embodiment of the present invention, a search for the stored monitor-subject data can be made with facility and high speed.

According to an embodiment of the present invention, video data and/or meta data transmitted from a monitor terminal is accumulated, search criteria are stored in advance, where the search criteria are used for extracting desired data from the video data and/or the meta data, the search criteria stored in advance are displayed, and meta data and/or video data satisfying a predetermined search criterion is extracted when the predetermined search criterion is selected from among the displayed search criteria, and the extracted meta data and/or the extracted video data is displayed.

According to the above-described configuration, the meta data and/or the video data satisfying the predetermined search criterion is extracted when the predetermined search criterion is selected from among the displayed search criteria.

According to an embodiment of the present invention, when the predetermined search criterion is selected from among the displayed search criteria, the meta data and/or the video data satisfying the predetermined search criterion is extracted. Accordingly, the number of steps performed for making the search is reduced and the search can be made with efficiency.

BRIEF DESCRIPTION OF THE DRAWINGS

FIG. 7 is an example displayed search-screen image according to another embodiment of the present invention.

DESCRIPTION OF THE PREFERRED EMBODIMENTS

Hereinafter, an embodiment of the present invention will be described with reference to the attached drawings.

Figure 1:
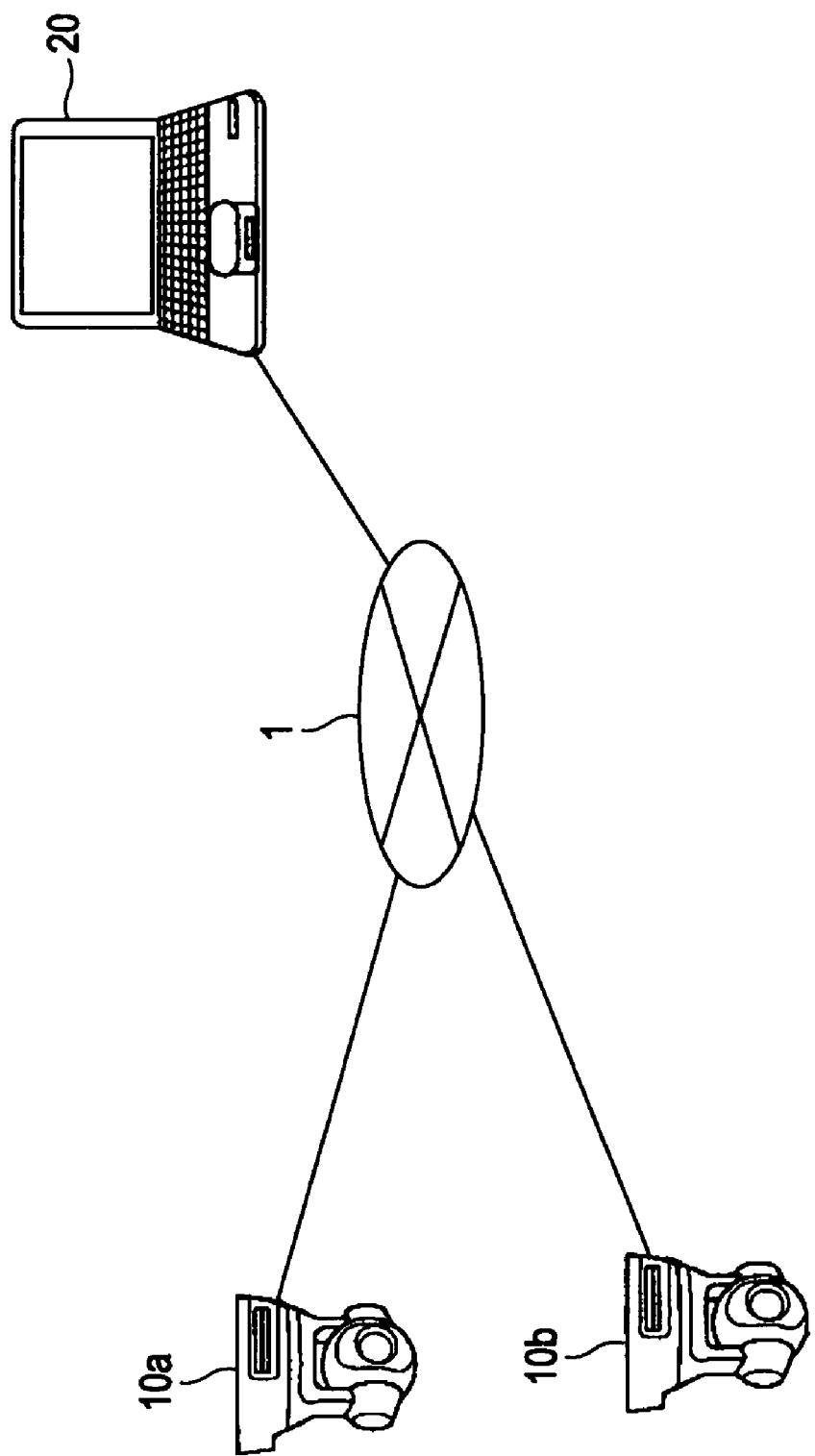
FIG. 1 shows an example configuration of a monitor system according to an embodiment of the present invention.

FIG. 1 schematically shows the configuration of a monitor system according to the above-described embodiment. In the monitor system, monitor terminals 10a and 10b are connected to a monitor device 20 via a network 1. Each of the monitor terminals 10a and 10b is provided, as a camera having the function of generating meta data. Namely, each of the monitor terminals 10a and 10b includes an image-pickup unit (not shown) configured to pick up an image of a monitor subject and a meta-data-generation unit (not shown) configured to generate meta data which will be described later from data on the image picked up by the image-pickup unit. Each of the monitor terminals 10a and 10b outputs video data and meta data, and each of the output video data and meta data is transmitted to the monitor device 20 via the network 1.

The monitor device 20 is provided, as a computer or the like, so that the monitor device 20 can store and analyze the above-described video data and meta data transmitted from the monitor terminal 10a and/or the monitor terminal 10b, and control each of the monitor terminals 10a and 10b by issuing a codec-switching instruction for the image picked up by each of the monitor terminals 10a and 10b, for example. According to the above-described embodiment, the monitor device 20 stores and/or analyzes the data transmitted from the monitor terminals 10a and 10b, and controls each of the monitor terminals 10a and 10b. However, a server may be provided separately so that the server stores and/or analyzes the data, and the monitor device 20 may control each of the monitor terminals 10a and 10b, and read the data.

The meta data is generated by each of the monitor terminals 10a and 10b, and used, as information about the attribute of data on video picked up by the image-pickup unit. The meta data is generated when a moving subject is detected by at least one of the monitor terminals 10a and 10b, where the meta data includes object information indicating the identification (ID), coordinates, size, and so forth of the moving subject (object), data on the time where the video is picked up, information about the orientation (pan, tilt, and so forth) of the at least one of the monitor terminals 10a and 10b, information about the position of the at least one of the monitor terminals 10a and 10b, information about the signature of the picked up video and/or images, and so forth.

Figure 2:
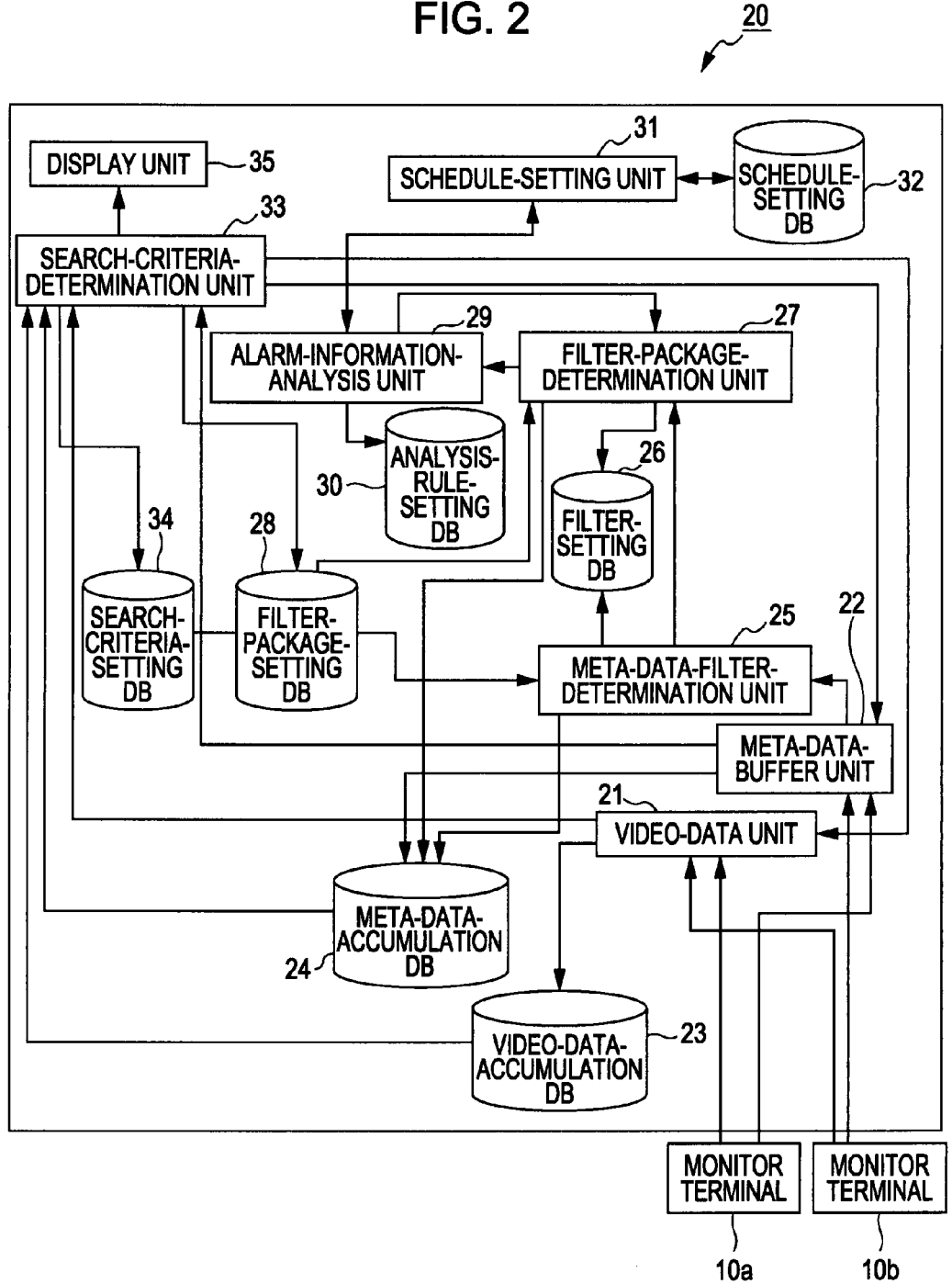
FIG. 2 is a block diagram showing an example internal configuration of a monitor device according to another embodiment of the present invention.

Next, the configuration of each of units of the monitor device 20 of the above-described embodiment will be described with reference to a block diagram of FIG. 2. Upon receiving the video data and the meta data transmitted from the monitor terminal 10a and/or the monitor terminal 10b, the monitor device 20 transmits the video data to a video-data-buffer unit 21 and transmits the meta data to a meta-data-buffer unit 22. Upon receiving the video data transmitted from the monitor terminal 10a and/or the monitor terminal 10b, the video-data buffer unit 21 decodes the video which had been encoded. The meta-data-buffer unit 22 stores the meta data transmitted from the monitor terminal 10a and/or the monitor terminal 10b, and transmits the stored meta data to a meta-data-filter-determination unit 25 which will be described later.

The meta-data-filter-determination unit 25 determines whether or not the meta data acquired from the meta-data-buffer unit 22 and/or meta data acquired from a meta-data-accumulation database (DB) 24 satisfies the condition of a meta-data filter that had already been set so that record data that had already been stored in the meta-data-communication DB 24 reflects the determination result. Further, the meta-data-filter-determination unit 25 notifies a filter-package-determination unit 27 of the filtering result. Information about the set meta-data filter is stored in a meta-data-filter-setting DB 26.

The meta-data filter (hereinafter referred to as the filter) denotes a determination condition on which alarm information is generated from the object information. The alarm information is obtained by analyzing the meta data satisfying the filter condition, and calculating the speed of the object on the basis of changes in values of the object position, confirming whether or not the object passes a predetermined line, or analyzing the above-described data in combination. As the filter types, the determination condition "Appearance" provided, so as to generate the alarm information when the monitor subject appears in a predetermined area, the determination condition "Disappearance" provided, so as to generate the alarm information when the monitor subject appears in the predetermined area and disappears from the predetermined area, the determination condition "Passing" provided, so as to generate the alarm information when the monitor subject passes a predetermined line, the determination condition "Capacity" provided, so as to generate the alarm information when a head count is taken in a predetermined area and the value of the head count exceeds a predetermined number, where the "Capacity" denotes the subject-limit number, the determination condition "Loitering" provided, so as to generate the alarm information when the subject loiters in a predetermined area, and so forth are prepared.

As data included in the alarm information, "accumulated-object number" indicating the number of at least one object satisfying the filter condition, "object number" indicating the number of at least one object satisfying the filter condition in a predetermined frame, information about the attribute of at least one object satisfying the filter condition, and so forth are provided. Each of the above-described data is recorded when one of the above-described filters, the filter corresponding to the determination condition "Capacity" or the like, is used so that the alarm information is generated on the basis of the accumulated-object number.

Figure 3A:
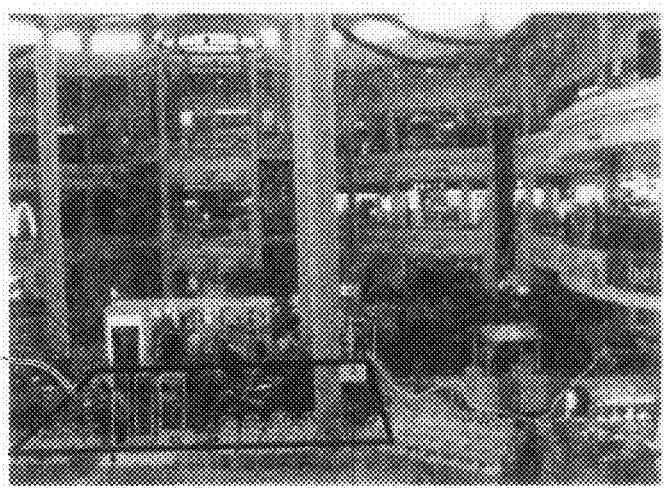
FIG. 3A shows an example filter according to another embodiment of the present invention.
Figure 3B:
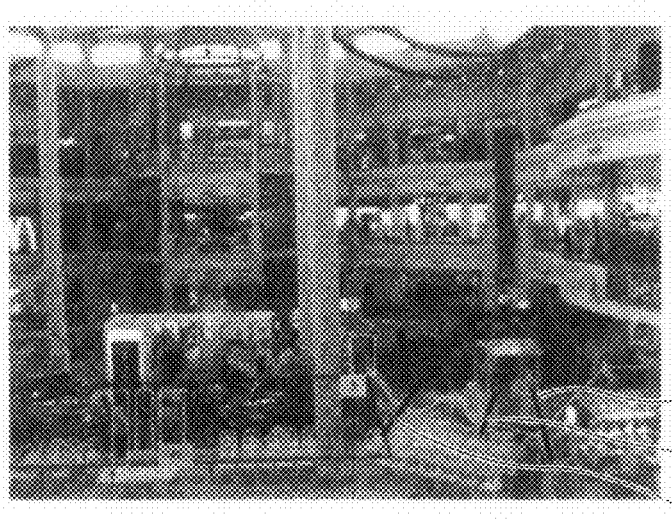
FIG. 3B shows an example package according to another embodiment of the present invention.
Figure 3C:
FIG. 3C is an example filter according another embodiment of the present invention.

Further, a plurality of the above-described filters may be used in combination and set, as a filter package (hereinafter referred to as the package). For example, a package C may be set when the conditions corresponding to both filters A and B are satisfied, and a package D may be set when either the condition corresponding to the filter A or that corresponding to the filter B is satisfied. Each of FIGS. 3A, 3B, and 3C shows an example set filter and/or an example set package. In FIGS. 3A, 3B, and 3C, a few number of the filters and/or packages are used in a monitor system configured to pick up images of the entire shopping mall at a wide angle, for example.

In FIG. 3A, a filter FT1 is set so that when at least one object is detected in an area AR1, the at least one object is detected and the number of the at least one object is counted. In FIG. 3B, a Passing filter A is set so that when the at least one object passes a line LN1, the at least one object is detected and the number thereof is counted, a Passing filter B is set so that when the at least one object passes a line LN2, the at least one object is detected and the number thereof is counted, and a Passing filter C is set so that when the at least one object passes a line LN3, the at least one object is detected and the number thereof is counted. Further, in FIG. 3B, a package PK1 is set so that only when the at least one object passes the lines LN1 to LN3 in sequence, the at least one object is detected and the number thereof is counted. In FIG. 3C, a filter FT2 is used so that when the at least one object is detected in the area AR1 and the object loiters in the area AR1 over a predetermined time period, the at least one object is detected and the number thereof is counted. Each of the above-described packages may include not only the filters used in the monitor device 20, but also filters set to different monitor devices.

Returning to FIG. 2, the filter-package-determination unit 27 reads data from a filter-package-setting DB 28 storing information about the above-described set packages, and determines whether or not the meta data transmitted to the filter-package-determination unit 27 agrees with the package conditions, so that stored data that had already been stored in the meta-data-accumulation DB 24 reflects the determination result. Further, if the alarm information is to be generated on the basis of the determination result, the filter-package-determination unit 27 generates the alarm information.

An alarm-information-analysis unit 29 analyzes the alarm information acquired from the filter-package-determination unit 27, performs control processing so that the monitor terminal 10a and/or the monitor terminal 10b, and peripheral devices perform appropriate operations, and transmits information to a display unit 35. The alarm-information-analysis unit 29 analyzes the alarm information according to various methods. For example, when an alarm is issued continuously over a predetermined time period, the alarm is assumed to be a square-wave alarm even though the issued alarm is an impulse-wave alarm. The above-described method is referred to as "continuous time". Further, when information about the alarm is generated within a specified time period at a rate higher than a specified rate, the generation frequency of the alarm information is analyzed. The above-described method is referred to as "generation frequency". Still further, when at least one object exists in a specified area at a rate higher than a specified rate, the rate is analyzed. The above-described method is referred to as "occupation area". The alarm-information-analysis unit 29 can select any of the above-described methods. Further, a user can set another analysis method. The package reselection and/or the schedule change can be performed on the basis of the analysis result.

An analysis-rule-setting DB 30 stores information about analysis rules. The analysis-rule information is used by the alarm-information-analysis unit 29, so as to make the above-described analysis. The analysis-rule information stored in the analysis-rule-setting DB 30 includes, for example, information about an analysis-rule number and/or an analysis-rule name provided, so as to uniquely identify alarm-analysis information, information about a package number and/or a package name provided, so as to uniquely specify a package used for making an alarm analysis, information about the analysis methods "continuous time", "generation frequency", "occupation area", and so forth, information about detailed setting items indicating time and/or threshold-value frequency, the detailed setting items being required to perform the analysis methods, information about operations performed when the condition is satisfied, where the operations are performed, so as to perform an action, change from one package to another, make a change in the analysis rule, and so forth.

A schedule-setting DB 32 stores information about schedule settings provided, so as to set the date and/or time where the analysis rule and/or the package is applied. Information stored in the schedule-setting DB 32 includes information about a schedule number and/or a schedule name provided, so as to uniquely identify schedule information, information about the start time (year, month, day, time, minute, and second) where the application of the analysis rule and/or the package is started, information about the finish time (year, month, day, time, minute, and second) where the application of the analysis rule and/or the package is finished, information about an analysis-rule number provided, so as to specify the analysis rule applied within a scheduled time period, and so forth.

A schedule-setting unit 31 monitors the schedule. At the scheduled date and time on which data is stored in the schedule-setting DB 32, predetermined analysis rule and/or package is applied. For example, during business hours, the alarm information is analyzed according to the method "generation frequency" so that whether or not a passenger and/or the luggage of the passenger is caught in an automatic door is determined. After the business hours, an alarm to be issued is changed to an alarm "intrusion" issued when the intrusion of any object is detected.

A search-criteria-determination unit 33 extracts data agreeing with search criteria specified by the user from the video data and/or the meta data accumulated on the video-data-accumulation DB 23 and/or the meta-data-accumulation DB 24, and the video-data-buffer unit 21 and/or the meta-data-accumulation DB 24. The search criteria are not specified by the user each time the data is extracted. Namely, information about combinations of the filters and/or the packages is set, as the search criteria in advance, and a search is made at the time where the set information is selected by the user. A search-criteria-setting DB stores the search criteria including the combination of the filters and/or the packages, for example, and also stores information about a monitor terminal for which the filter and/or the package is used.

The display unit 35 includes a liquid-crystal panel or the like and shows the meta data and/or the video data extracted by the search-criteria-determination unit 33.

Next, search processing performed by each of the monitor terminals according to the above-described embodiment will be described with reference to a flowchart of FIG. 4 and example displayed screen images shown in FIGS. 5, 6, and 7. First, search-criteria registration is accepted in advance, at step S11, the criteria registration being performed, so as to narrow down data including the filters, the packages, and so forth. The search criteria registered at that time is stored in a search-criteria-setting DB 34 shown in FIG. 2.

Next, the video data and the meta data are acquired from the monitor terminals 10*a* and 10*b*, at step S12, the video-data-buffer unit 21 is made to store the acquired video data, and the meta-data-buffer unit 22 is made to store the acquired meta data, at step S13. The video data stored in the video-data-buffer unit 21 is accumulated on the video-data DB 23 and the meta data is accumulated on the meta-data-buffer unit 22 is stored in the meta-data-accumulation DB 24, respectively, after a lapse of a predetermined time period.

At that time, it is determined whether or not the transmitted meta data satisfies the condition of the filter and/or the package in the meta-data-filter-determination unit 25 and/or the filter-package-determination unit 27. If it is determined that the alarm information is to be generated, the alarm information is generated. Then, information about a result of the determination made by the meta-data-filter-determination unit 25, information about a result of the determination made by the filter-package-determination unit 27, and the alarm information are accumulated on the meta-data-accumulation DB 24 again.

When the user wishes to extract predetermined data in the state where a predetermined amount of the video data and the meta data are accumulated through steps S11 to S13 performed in repetition, the user starts a search-software program, at step S14. The search-software program includes a graphical-user interface (GUI) shown in FIG. 5, for example, and the search-criteria-determination unit 33.

Here, a search-screen image will be described in detail with reference to FIG. 5. The search-screen image includes a storage-date-selection part, a monitor-terminal-selection part, a detailed-criteria-selection part, a storage-attribute-selection part that are provided in the upper-left region of the search-screen image in that order. The search-screen image further includes a storage-attribute-selection part and a search-result-display part. The storage-date-selection part is provided, so as to receive information about the year, month, and day, the information being selected. The year, month, and day describes the date where monitor data is stored in the monitor device. The selected information about the year, month, and day is set, as the search criteria and a search is made by using information about the selected year, month, and day, as key information. In the storage-date-selection part, initial settings can be made in advance so that the data storage can be performed within three days, a week, and so forth within specified bounds of date. Therefore, if the user checks stored data once a week, the initial settings may be made so that only a week's worth of data is displayed. Subsequently, when the search-software program is started, only the last week's worth of data is extracted automatically and the number of steps of making the search is reduced.

In the monitor-terminal-selection part, the monitor terminals controlled by the monitor system are shown in an at-a-glance chart. When a predetermined monitor terminal is selected from among the at-a-glance chart, only data acquired and stored by the selected monitor terminal is extracted from the video-data-buffer unit 21 and/or the meta-data-buffer unit 22, and the video-data-accumulation DB 23 and/or the meta-data-accumulation DB 24. The extracted stored data is displayed in the search-result-display part. FIG. 6 shows the above-described displayed stored data, for example. In the monitor-terminal-selection part, a monitor terminal referred to as "RZ50" is selected, and data on images picked up and stored by the monitor terminal RZ50 is displayed in another at-a-glance chart generated in the search-result-display part.

Figure 6:
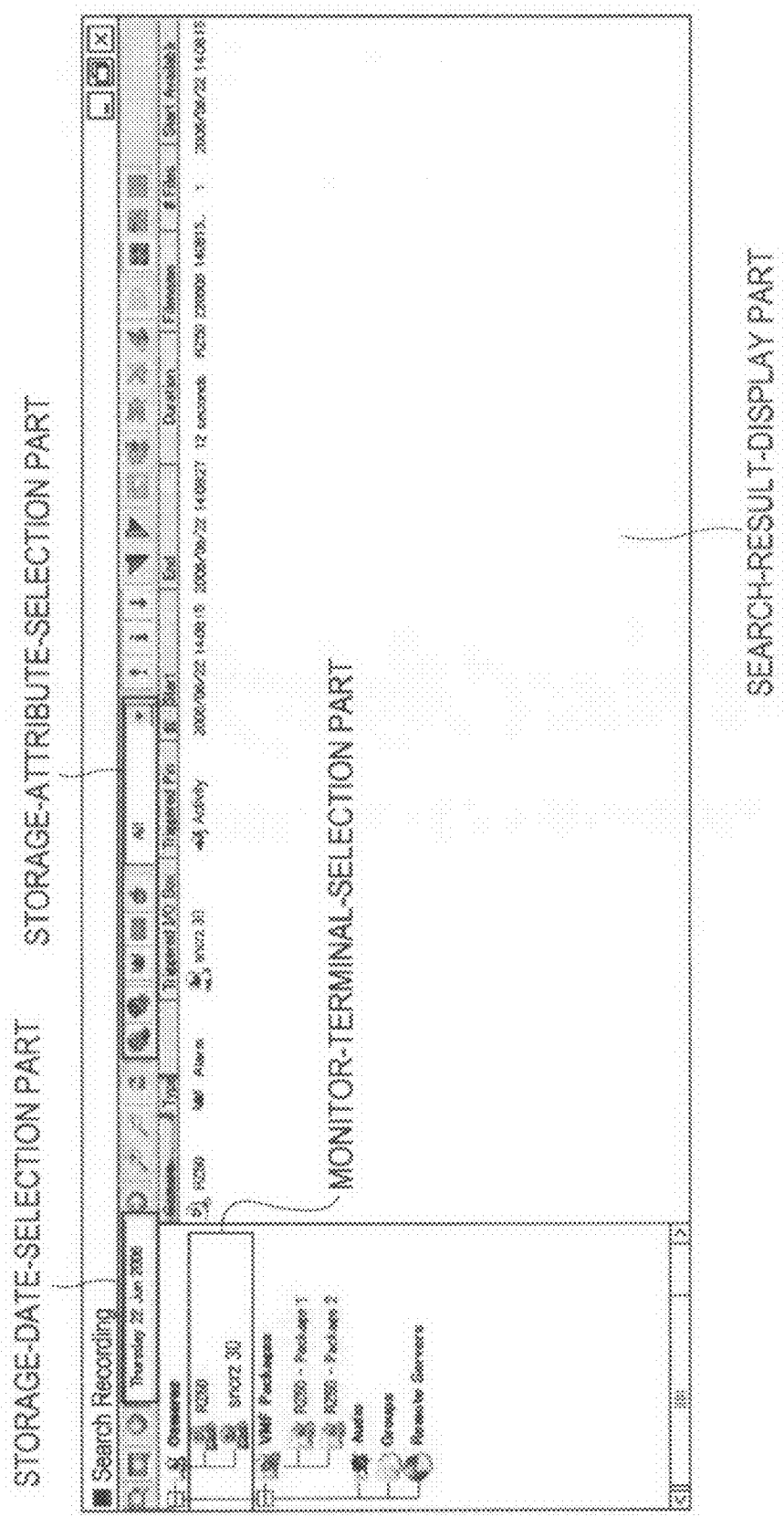
FIG. 6 is an example displayed search-screen image according to another embodiment of the present invention.

Further, in FIG. 6, only one item of stored data is displayed according to the search result. However, if the search result shows that at least two stored-data items exist, the search result is displayed in at least two rows. Further, in FIG. 6, the names of monitor terminals are displayed in another at-a-glance chart generated in the monitor-terminal-selection part. However, the monitor terminals may be shown by type. Namely, a monitor terminal configured to pick up images across a wide area and a monitor terminal configured to pick up images across a narrow area may be displayed separately. In that case, if the user selects one of the above-described types, information about a plurality of monitor terminals classified as monitor terminals of the selected type is set, as the search criteria.

Figure 4:
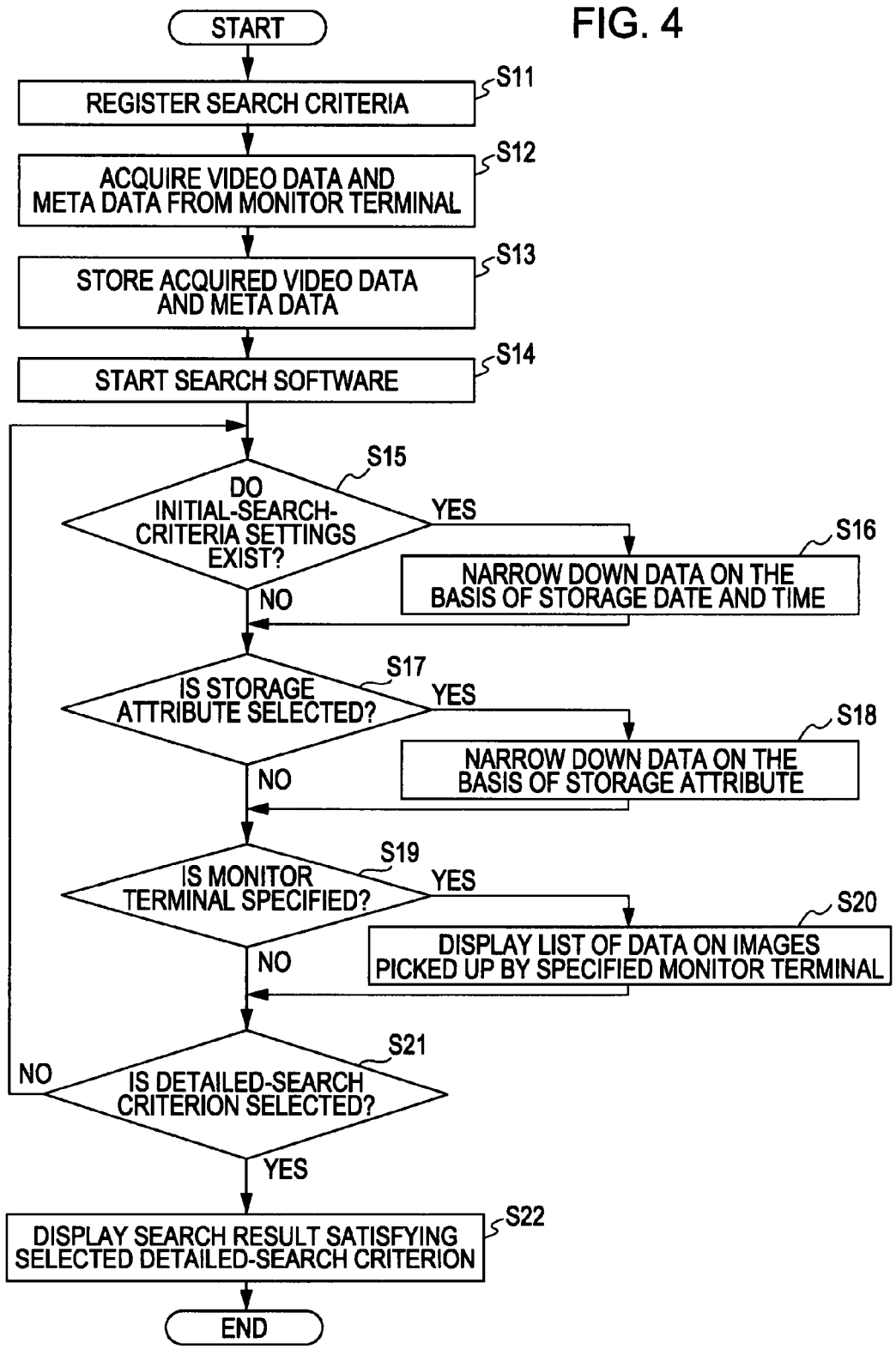
FIG. 4 is a flowchart illustrating example search processing performed according to another embodiment of the present invention.
Figure 5:
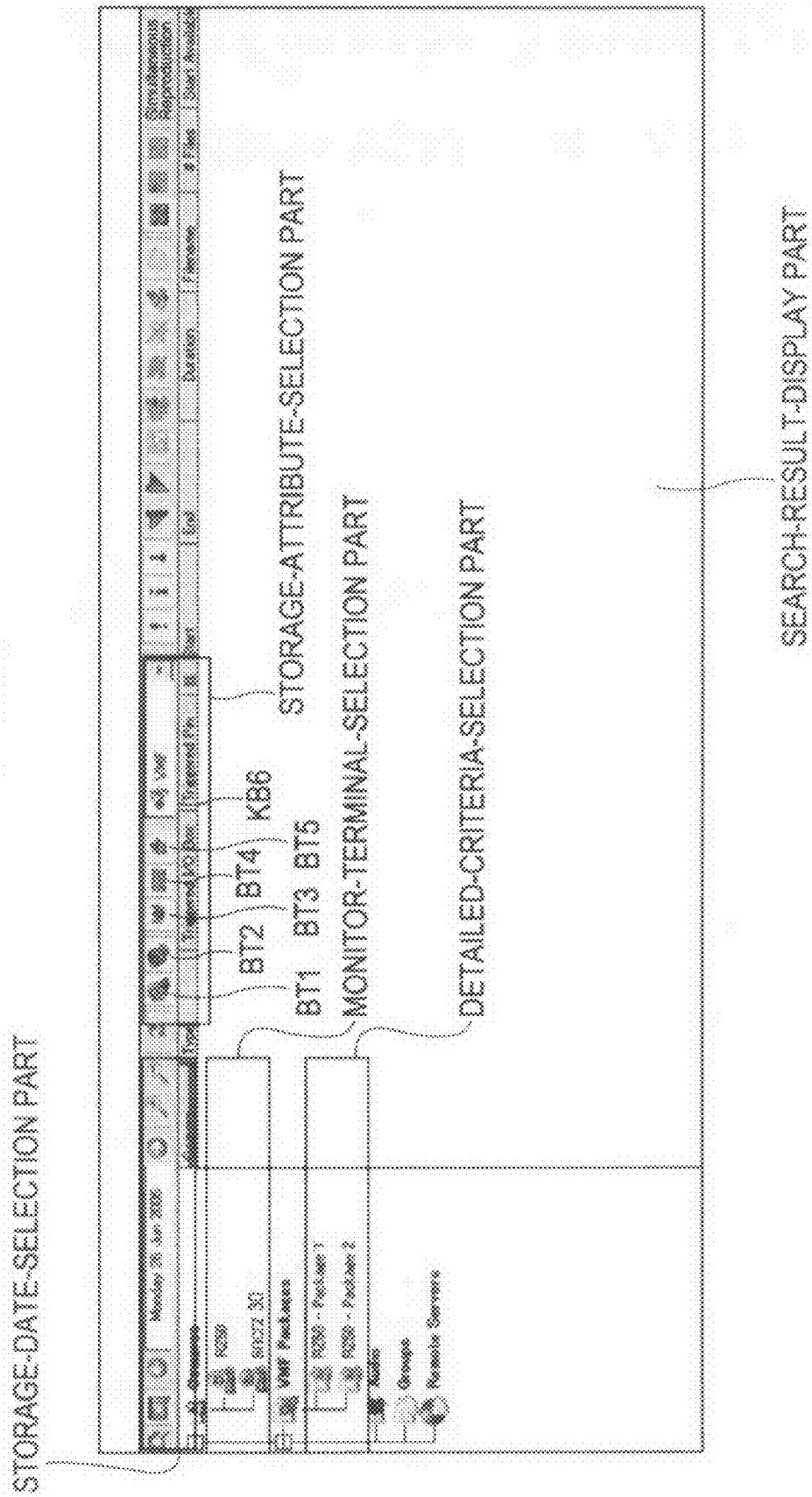
FIG. 5 is an example displayed search-screen image according to another embodiment of the present invention.

Returning to FIG. 5, in the detailed-criteria-selection part, the search criteria registered, at step S11 shown in FIG. 4, are displayed in the at-a-glance chart including a treelike chart, a list, and so forth. When a specified search criterion is selected from among the at-a-glance chart, only stored data satisfying the search criterion, namely, the condition of the filter and/or the package is extracted, and the extracted stored data is displayed in the search-result-display part.

FIG. 7 shows the above-described extracted and displayed stored data, for example. In the detailed-criteria-selection part, a package or a search criterion referred to as "RX550-Package 1" is selected, and stored data satisfying the criterion set, as the package "RX550-Package 1" is displayed in the search-result-display part. If the search criterion is selected in the detailed-criteria-selection part, details on the filters "Appearance", "Passing", and so forth (item: "Filter"), detailed information about a detected object (item: "Object detail"), information about the time where the alarm information is generated (item: "Alarm Time", and so forth are displayed, as items displayed in the search-result-display part.

Further, for example, links and/or buttons (not shown) for performing editing are shown in the detailed-criteria-selection part, so as to add other search criteria, make a change in the search criteria, and so forth. By using the function of the links and/or buttons, addition of another search criterion and/or edits for the search criteria can be achieved after the search criteria are registered and/or during the search.

Returning to FIG. 5 illustrating the search-screen image, the storage-attribute-selection part is provided, so as to specify an attribute, as a search criterion. The storage-attribute-selection part includes, for example, a camera button BT1, a sound button BT2, an alarm button BT3, a schedule button BT4, a manual button BT5, a combo box KB6, and so forth. When any of the above-described buttons is pressed down, the state where the button is pressed down is retained, and the current settings are valid over the time period where the above-described state is retained.

When the camera button BT1 is pressed down, a criterion is set so that only stored data on an image picked up by the monitor terminal is selected. Similarly, when the sound button BT2 is pressed down, another criterion is set so that only sound data is extracted. Further, when the alarm button BT3 is pressed down, another criterion is set so that only data including the alarm information is extracted, and when the schedule button BT4 is pressed down, another criterion is set so that only data stored on the basis of the schedule is extracted. Still further, when the manual button BT5 is pressed down, another criterion is set so that only data on an instruction to start picking up an image manually is extracted, the instruction being provided, so as to trigger the image-pickup processing. In the combo box KB6, settings on the attributes can be changed so that only stored data for which the alarm information is generated and/or stored data satisfying the condition of the filter and/or the package is extracted, for example.

Returning to the flowchart of FIG. 4, the search processing will further be described. After the search-software program is started, at step S14, it is determined whether or not settings on initial-search criteria are made, namely, whether or not the date-and-time settings are made in the storage-date-selection part, for example, at step S15. When the initial-search-criteria settings are made, the stored data is narrowed down by using information about the storage date-and-time, as a search criterion, at step S16. If the initial-search-criteria settings are not made, it is determined whether or not any criterion is set in the storage-attribute-selection part, at step S17. If any criterion is set in the storage-attribute-selection part so that the alarm button 3 is pressed down, for example, the stored data is narrowed down by using information about the selected storage attribute, as the search criterion, at step S18.

If no search criterion is set in the storage-attribute-selection part, it is determined whether or not any of the monitor terminals is selected in the monitor-terminal-selection part, at step S19. If any of the monitor terminals is selected, only data on an image picked up and/or stored by the selected monitor terminal is extracted, and an image of the extracted data is displayed on the display unit 35 shown in FIG. 2, at step S20. Next, it is determined whether or not any of the filters and/or the packages is selected in the detailed-criteria-selection part, as the search criterion, at step S21. If a detailed search criterion is specified, stored data satisfying the specified detailed search criterion is extracted and an image of the stored data is displayed on the display unit 35, at step S22. If no detailed search criterion is specified, the processing returns to step S15, so as to wait until the user specifies a search criterion.

As described above, the filter functioning, as a determination condition on which the alarm information is generated, and/or the package including a plurality of the filters tied to one another by using logic criteria is registered in advance, as a criterion by which monitor data stored in the monitor terminals is searched. Therefore, a search can be made by performing an easy operation such as clicking on the filter and/or the package, which reduces the number of steps performed for making the search.

Further, since a search criterion frequently used by the user can be set in advance by specifying the filter and/or the package, for example, the user does not have to input the search criterion every time the user wishes to make a search. Therefore, when the user particularly wishes to search through a large amount of data, the time required for the search is significantly reduced.

Further, since a search can be made on the basis of the detailed-criteria settings and the detailed-criteria settings can be edited on a single GUI provided, as a search-screen image, the search and the detailed-criteria settings can be achieved separately. For example, the detailed-criteria settings may be made by a skilled person and the search may be made by a different person.

Further, when the packages are shown in the treelike chart in the detailed-criteria-selection part, as the search criteria, the trees can be opened so that the hierarchy thereof is smoothed out, and a plurality of the filters shown under different packages can be selected and searched. Still further, when the packages are shown on the list, the plurality of filters shown under the different packages can be selected and searched without making any change in the list. By performing the above-described operations, the search can be made in a flexible manner by performing a reduced number of steps.

In the above-described embodiments, a camera including the image-pickup unit is described, as the monitor terminal, for example. However, a microphone may be used, as the monitor terminal.

Further, in the above-described embodiments, the attributes of stored data including video data and/or sound data, a method by which the data storage is started, and so forth are described, for example, as attribute criteria functioning, as the search criteria. The method by which the data storage is started may include a method of starting the data storage manually by the user, a method of starting the data storage automatically on the basis of schedule control, a method of starting the data storage when a predetermined criterion is satisfied, and so forth. However, the attribute criteria may include information added to the stored data by the user, where the added information includes information about a bookmark, a comment, and so forth.

Further, in the above-described embodiments, the date and time where data is stored are specified in the storage-date-selection part, and the date-and-time bounds are specified, as the initial settings. However, according to another embodiment of the present invention, the date and time where the data storage is performed may be specified infallibly when the search-software program is started.

Further, in the above-described embodiments, a button or the like used for issuing an instruction to start making a search is not provided. Namely, the search is started when a predetermined criterion is selected in the monitor-terminal-selection part and/or the detailed-criteria-selection part. However, a GUI used for issuing an instruction to start the search may be provided separately, the GUI including a search button or the like.

Further, according to the above-described embodiments, the search is started by selecting the monitor terminal and/or the detailed criterion. However, if the detailed-criteria settings are not required to make the search, the above-described selection may not be made.

Further, according to the above-described embodiments, information about the date and time where the data storage is performed can be set, as an initial-search criterion. However, a search criterion assumed to be used frequently, such as "Determine the entire screen image to be an area across which a search for a monitor object is made", for example, may be set to the monitor system in advance, as the initial-search criterion, without waiting until the user sets the above-described search criterion to the monitor system.

It should be understood by those skilled in the art that various modifications, combinations, sub-combinations and alterations may occur depending on design requirements and other factors insofar as they are within the scope of the appended claims or the equivalents thereof.

What is claimed is:

1. A monitor system including at least one monitor terminal and at least one monitor device,
   wherein the monitor terminal includes an image-pickup unit configured to pick up an image of a monitor subject and generate video data; and
   a meta-data-generation unit configured to generate meta data indicating attribute information of the monitor subject of which image is picked up by the image-pickup unit,
   wherein the monitor device includes a video-data-accumulation unit configured to store the video data transmitted from the image-pickup unit;
   a search-criteria-storage unit configured to store search criteria in advance, the search criteria being used, so as to extract desired data from video data accumulated on the video-data-accumulation unit and meta data accumulated on the meta-data-accumulation unit;
   a display unit configured to display the search criteria stored in the search-criteria-storage unit; and
   a control unit configured to extract meta data satisfying a predetermined search criterion when the predetermined search criterion is selected from among the search criteria displayed on the display unit, and display the extracted meta data on the display unit.

2. A monitor device comprising:
   a video-data-accumulation unit configured to store video data transmitted from an image-pickup unit of a monitor terminal;
   a meta-data-accumulation unit configured to store meta data transmitted from a meta-data-generation unit of the monitor terminal;
   a search-criteria-storage unit configured to store search criteria in advance, the search criteria being used, so as to extract desired data from video data accumulated on the video-data-accumulation unit and meta data accumulated on the meta-data-accumulation unit;
   a display unit configured to display the search criteria stored in the search-criteria-storage unit; and
   a control unit configured to extract meta data satisfying a predetermined search criterion when the predetermined search criterion is selected from among the search criteria displayed on the display unit, and display the extracted meta data on the display unit.

3. The monitor device according to claim 2, further comprising:
   a meta-data-filter-setting-storage unit configured to store information about settings on a filter functioning, as criteria provided, so as to extract data for which an alarm is to be issued from the meta data; and
   a filter-package-storage unit configured to store information about settings on a filter package including a combination of a plurality of the filters,
   wherein the search criteria stored in the search-criteria-storage unit includes the filter and/or the filter package, and/or a combination of the filter and the filter package.

4. The monitor device according to claim 3, further comprising:
   a search-criteria-addition unit configured to add another criterion other than the search criteria stored in the search-criteria-storage unit.

5. A search method comprising the steps of:
   accumulating video data transmitted from an image-pickup unit of a monitor terminal;
   accumulating meta data transmitted from a meta-data-generation unit of the monitor terminal;
   storing search criteria in advance, the search criteria being used, so as to extract desired data from the video data and/or the meta data;
   displaying the search criteria stored in advance; and
   extracting meta data and/or video data satisfying a predetermined search criterion when the predetermined search criterion is selected from among the displayed search criteria, and displaying the extracted meta data and/or the extracted video data.

6. A search program product comprising a non-transitory computer readable medium encoded with a search program which when executed performs the steps of:
   accumulating video data transmitted from an image-pickup unit of a monitor terminal;

accumulating meta data transmitted from a meta-data-generation unit of the monitor terminal;

storing search criteria in advance, the search criteria being used, so as to extract desired data from the video data and/or the meta data;

displaying the search criteria stored in advance; and extracting meta data and/or video data satisfying a predetermined search criterion when the predetermined search criterion is selected from among the displayed search criteria, and displaying the extracted meta data and/or the extracted video data.

* * * * *